(12) United States Patent
Ramdass et al.

(10) Patent No.: US 9,231,957 B2
(45) Date of Patent: Jan. 5, 2016

(54) MONITORING AND CONTROLLING A STORAGE ENVIRONMENT AND DEVICES THEREOF

(71) Applicant: NetApp, Inc., Sunnyvale, CA (US)

(72) Inventors: Dennis Ramdass, Mountain View, CA (US); Stephanie Zhimao He, Fremont, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 14/268,584

(22) Filed: May 2, 2014

(65) Prior Publication Data

US 2015/0113619 A1    Apr. 23, 2015

Related U.S. Application Data

(60) Provisional application No. 61/892,333, filed on Oct. 17, 2013.

(51) Int. Cl.
*H04L 29/06* (2006.01)
*G06F 3/06* (2006.01)

(52) U.S. Cl.
CPC ............ *H04L 63/102* (2013.01); *G06F 3/0605* (2013.01); *G06F 3/067* (2013.01); *G06F 3/0622* (2013.01); *G06F 3/0637* (2013.01); *H04L 63/04* (2013.01)

(58) Field of Classification Search
CPC ..... H04L 63/102; H04L 63/04; G06F 3/0605; G06F 3/0622; G06F 3/0637; G06F 3/067

USPC .......................................................... 726/6
See application file for complete search history.

(56) References Cited

U.S. PATENT DOCUMENTS

| | | | | |
|---|---|---|---|---|
| 7,793,101 | B2 * | 9/2010 | Wipfel et al. | 713/168 |
| 8,332,919 | B2 * | 12/2012 | Gomi et al. | 726/6 |
| 8,434,131 | B2 * | 4/2013 | Varadharajan et al. | 726/4 |
| 2002/0019908 | A1 * | 2/2002 | Reuter et al. | 711/112 |
| 2006/0212673 | A1 * | 9/2006 | Fukuguchi et al. | 711/173 |
| 2010/0251339 | A1 * | 9/2010 | McAlister | 726/4 |
| 2012/0131341 | A1 * | 5/2012 | Mane et al. | 713/168 |
| 2012/0167197 | A1 * | 6/2012 | Kruger et al. | 726/16 |
| 2012/0203978 | A1 * | 8/2012 | Hori et al. | 711/154 |
| 2014/0137214 | A1 * | 5/2014 | Mane et al. | 726/4 |
| 2014/0366155 | A1 * | 12/2014 | Chang et al. | 726/27 |

* cited by examiner

*Primary Examiner* — Michael S McNally
(74) *Attorney, Agent, or Firm* — Gilliam IP PLLC (57) ABSTRACT

Data identifying server storage devices and logical storage entities is received. A storage object model based on the received data is generated. A first user type is associated with the server storage devices and logical storage entities. A second user type is associated with the logical storage entities. A first user is allowed to access data associated with the sever storage devices and the logical storage entities in response to determining that the first user is identified as the first user type. A second user is allowed to access data associated with the logical storage entities and not allowed to access data associated with the server storage devices in response to determining that the second user is identified as the second user type.

24 Claims, 4 Drawing Sheets

MONITORING AND CONTROLLING A STORAGE ENVIRONMENT AND DEVICES THEREOF

This application claims the benefit of U.S. Provisional Patent Application Ser. No. 61/892,333 filed on Oct. 17, 2013, which is hereby incorporated by reference in its entirety.

FIELD

The present application relates generally to storage networks and more specifically to monitoring and controlling a storage environment and devices thereof.

BACKGROUND

The creation and storage of digitized data has proliferated in recent years. Accordingly, techniques and mechanisms that facilitate efficient and cost effective storage of large amounts of digital data are common today. For example, a network environment of nodes may be implemented by an enterprise as a data storage system to facilitate the creation, storage, retrieval, and/or processing of their digital data. Such a data storage system may be implemented using a variety of storage architectures, such as a network-attached storage (NAS) environment, a storage area network (SAN), a direct-attached storage environment, and combinations thereof.

The foregoing data storage systems may comprise one or more data storage devices configured to store digital data within data volumes. A storage device may, for example, be a disk drive (e.g., hard disk drive (HDD)) organized as part of a disk array. Such data storage devices are not limited to disks or even magnetic storage devices and thus may, for example, comprise a solid state drive (SSD) or combinations of the foregoing. Individual storage devices of a data storage system may be identified by a logical unit number (LUN) or other identification scheme.

In a data storage system, information is stored on physical data storage devices as volumes that define a logical arrangement of storage space of the data storage devices. Information in the volumes is typically organized in a file system, which is a hierarchical structure of directories, files and data blocks. An example of a file system is a write-anywhere file layout (WAFL). A file may be implemented by the file system as a set of data blocks configured to store the actual data on one or more storage device of the data storage device.

A trend has developed in recent years to move many computing services, include data storage services, to multiple client (e.g., multiple different, unrelated client entities, such as may comprise independent and unassociated individuals, business entities, etc.) environments, such as cloud computing environments (i.e., computation, software, data access, and storage services system configuration in which the end-user, client, client system, etc. is agnostic and/or ignorant with respect to the physical location and configuration of the various system resources by virtue of shared underlying system resources) as may be hosted via the Internet. Such multiple client environments offer advantages in economies of scale, outsourcing of computing services, use of thin clients and less capable terminals (e.g., smart phones and tablet personal digital assistants) by users, and improved scaling.

There is an increasing demand for secure, multiple-client storage networks where client devices share the same physical storage infrastructure but having separate logical storage resources. Further, client devices require the ability to independently monitor/control such logical storage. Meanwhile, storage network administrators may be required to monitor/control both physical and logical storage entities in the overall storage network.

As the storage network administrators and client devices monitor distinct groups of storage entities within a storage network, and because they have different practical requirements for administering based on their particular usage, previous monitoring and control tools utilize separate management software to allow for independent management and monitoring of resources by an administrator and a client device. For example, object models corresponding to an overall network within management software configured for a network administrator are generally not usable by a user of the client device because the information used by the network administrator may not provide for adequate logical separation of storage entities (e.g. due to intermingling of information regarding physical and logical resources), and therefore, client devices would not be given access to such resources. Likewise, tools provided for client device do not organize and model the storage system in a manner that is useful for network administrators which require a more global control platform than is contemplated by object modeling in such tools.

SUMMARY

A method for monitoring and controlling a storage environment including a storage management computing device for receiving object data corresponding to a storage environment, the object data comprising data corresponding to physical and logical storage entities. A storage object model which associates physical and logical storage entities in a database is generated by the storage management computing device. An administrator-level user authentication configured to provide an administrator with access to information in the generated object model which corresponds to both physical and logical storage entities is generated by the storage management computing device. A user authentication configured to provide a user with access to information in the generated object model that corresponds to logical storage entities assigned to the user is generated by the storage management computing device. A dashboard configured to receive authentication information from either of an administrator-level or the user and to display information in accordance with a received authentication is provided by the storage management computing device.

A non-transitory computer readable medium having stored thereon instructions for monitoring and controlling a storage environment comprising executable code which when executed by a processor, causes the processor to perform steps including receiving object data corresponding to a storage environment, the object data comprising data corresponding to physical and logical storage entities. A storage object model which associates physical and logical storage entities in a database is generated. An administrator-level user authentication configured to provide an administrator with access to information in the generated object model which corresponds to both physical and logical storage entities is generated. A user authentication configured to provide a user with access to information in the generated object model that corresponds to logical storage entities assigned to the user is generated. A dashboard configured to receive authentication information from either of an administrator-level or the user and to display information in accordance with a received authentication is provided.

A storage management computing device includes a memory coupled to a processor configured to execute programmed instructions stored in the memory including receiving object data corresponding to a storage environment, the object data comprising data corresponding to physical and logical storage entities. A storage object model which associates physical and logical storage entities in a database is generated. An administrator-level user authentication configured to provide an administrator with access to information in the generated object model which corresponds to both physical and logical storage entities is generated. A user authentication configured to provide a user with access to information in the generated object model that corresponds to logical storage entities assigned to the user is generated. A dashboard configured to receive authentication information from either of an administrator-level or the user and to display information in accordance with a received authentication is provided.

DETAILED DESCRIPTION

Figure 1:
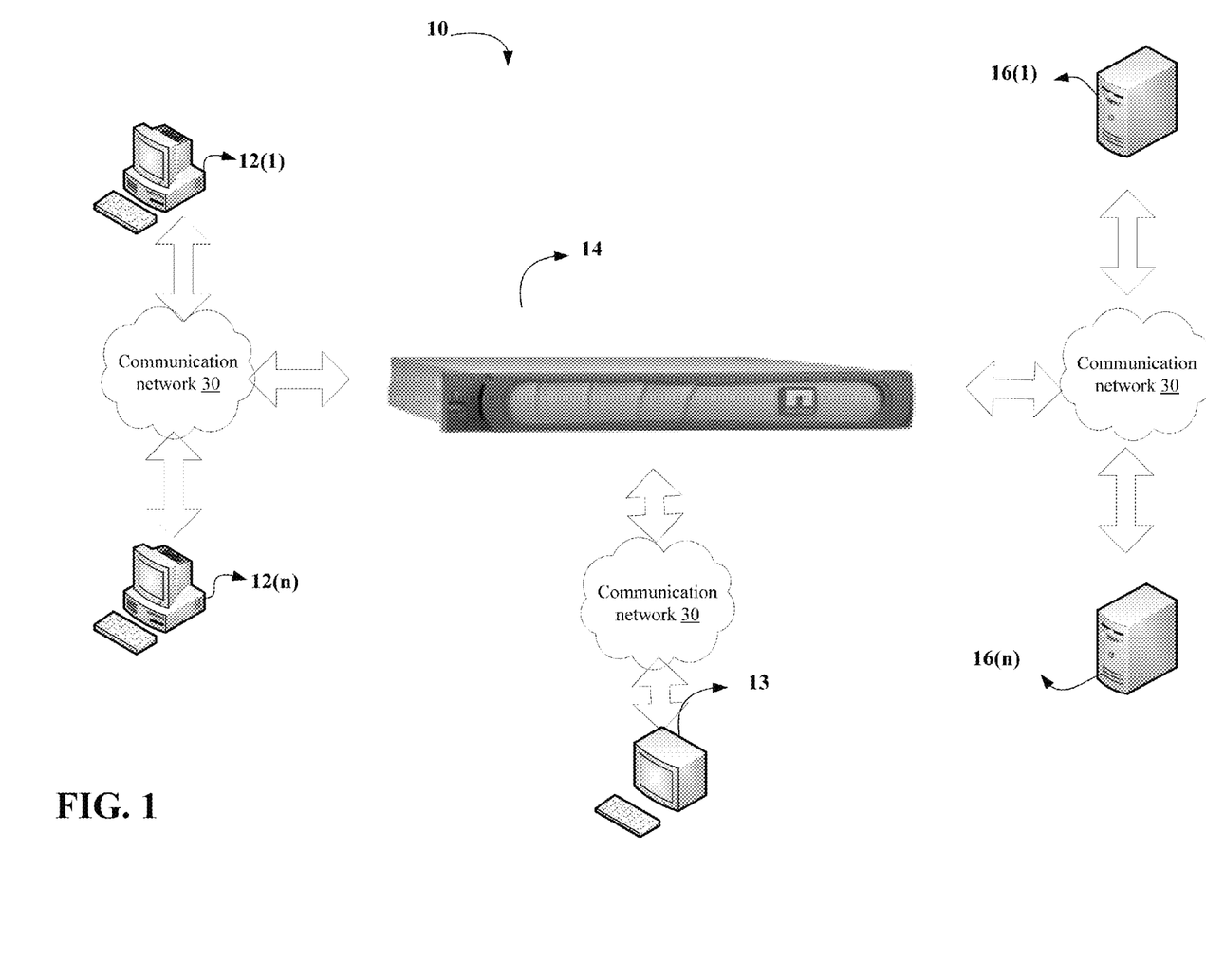
FIG. 1 is a block diagram of an environment with an exemplary storage management computing device.
Figure 2:
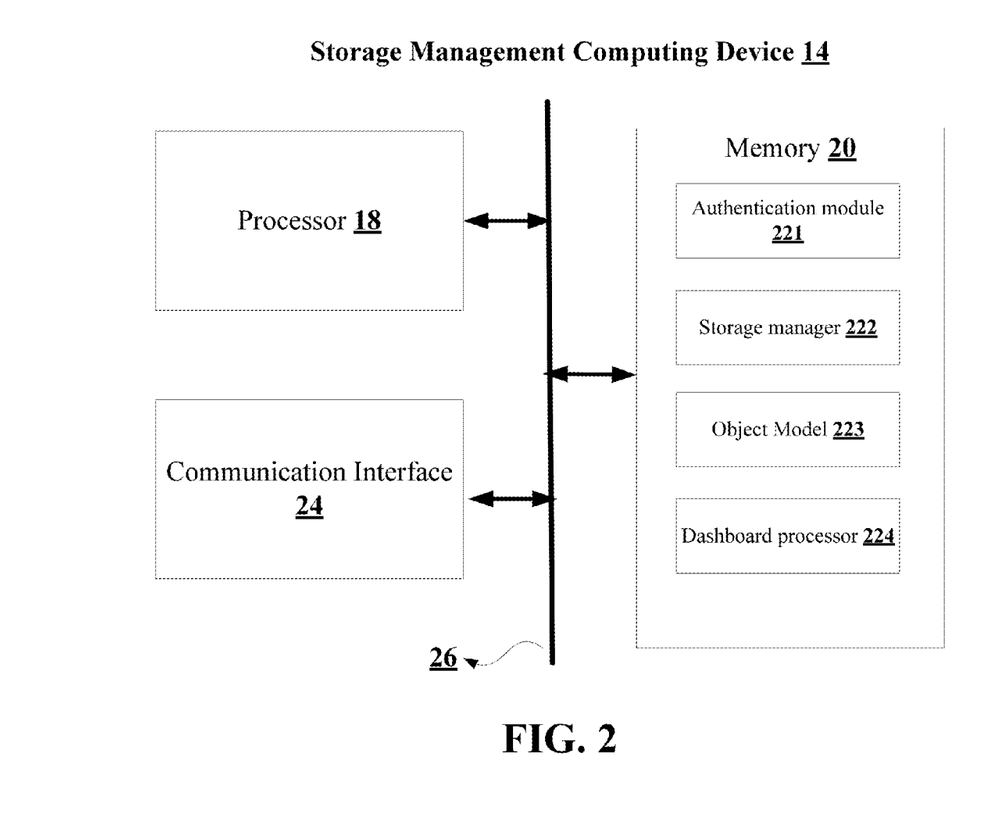
FIG. 2 is a block diagram of the exemplary storage management computing device shown in FIG. 1.

An environment 10 with an exemplary storage management computing device 14 is illustrated in FIGS. 1-2. In this particular example, the environment 10 include, a plurality of client computing devices 12(1)-12(n), a storage administration computing device 13, the storage management computing device 14 and a plurality of server storage servers 16(1)-16(n) coupled via one or more communication networks 30, although the environment could include other types and numbers of systems, devices, components, and/or other elements. In this example, the method for monitoring and controlling a storage environment is executed by the storage management computing device 14 although the approaches illustrated and described herein could be executed by other systems and devices. The environment 10 may include other types and numbers of other network elements and devices, as is generally known in the art and will not be illustrated or described herein. This technology provides a number of advantages including providing methods, non-transitory computer readable medium and devices for monitoring and controlling a storage environment.

Referring more specifically to FIGS. 1-2, in this example the storage management computing device 14 includes a processor 18, a memory 20, and a communication interface 24 which are coupled together by a bus 26, although the storage management computing device 14 may include other types and numbers of elements in other configurations.

The processor 18 of the storage management computing device 14 may execute one or more programmed instructions stored in the memory 20 for monitoring and controlling a storage environment as illustrated and described in the examples herein, although other types and numbers of functions and/or other operation can be performed. The processor 18 of the storage management computing device 14 may include one or more central processing units ("CPUs") or general purpose processors with one or more processing cores, such as AMD® processor(s), although other types of processor(s) could be used (e.g., Intel®).

The memory 20 of the storage management computing device 14 stores the programmed instructions and other data for one or more aspects of the present technology as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 18, can be used for the memory 20. Additionally, as illustrated in FIG. 2, the memory 20 of the storage management computing device 14 includes a plurality of modules configured to assist the storage management computing device 14 with monitoring and controlling a storage environment. In this example, the storage management computing device 14 includes an authentication module 221 which allows storage administration computing device 14 and/or plurality of client computing devices 12(1)-12(n) to monitor and control the plurality of server storage devices 16(1)-12(n) via the storage management computing device 14. By way of example only, the authentication module 221 may provide different rights and access to the plurality of the plurality of client computing devices 12(1)-12(n) and the storage administration computing device 13 to access the plurality of server storage devices 16(1)-16(n), although the authentication module 221 can perform other types functions. For example, the authentication module 221 can provide access to the storage administration computing device 13 to monitor and control physical and logical resources associated with the plurality of server storage devices 16(1)-16(n). In contrast, the authentication module 221 of the storage management computing device 14 may provide the plurality of client computing devices 12(1)-12(n) to define or manipulate logical resources of the plurality of server storage devices 16(1)-16(n) provisioned to the plurality of client computing devices 12(1)-12(n).

Additionally, the storage management computing device 14 further includes a storage manager module 222 configured to implement commands on the plurality of server storage devices 16(1)-16(n) received from either the plurality of client computing devices 12(1)-12(n) or the storage administration computing device 13. Additionally, the storage manager module 222 may be configured to manage the virtual environment, e.g. create/manage/monitor SVMs, assign SVMs to physical storage entities and also assign particular SVMs to each of the plurality of client computing devices 12(1)-12(n).

Additionally, the storage management computing device 14 further includes an object modeling module 223. By way of example only, the object modeling module 223 may be configured compile information associated with the plurality of server storage devices 16(1)-16(n) and to create an object model which can be utilized by the plurality of client computing devices 12(1)-12(n) or the storage administration computing device 13 to discover and monitor storage resources which can be administered at a given level. For example, information regarding the plurality of server storage devices 16(1)-16(n) may be gathered as well as information pertaining to logical designations (such as virtual machine/SVM which are defined, etc.). By way of example only, the gathered information may include data regarding IP addresses, host names, and any other identification information pertaining to the each of the plurality of server storage devices 16(1)-16(n). Additionally, the object modeling module 223 may compile identification information associated with the storage administration computing device 13 or the plurality of client computing devices 12(1)-12(n) in order to associate storage resources within the plurality of server storage devices 16(1)-16(n) with a particular user.

Additionally as illustrated in FIG. 2, the storage management computing device 14 also includes a dashboard processor module 224. In this example, the dashboard processor module 224 assists the storage management computing device 14 with displaying and/or providing information associated with users of plurality of client computing devices 12(1)-12(n) or the administrator using the storage administration computing device 13. By way of example only, a user of one of the plurality of client computing devices 12(1)-12(n) may want to monitor or control portions of the storage network on the plurality of server storage devices 16(1)-16(n) via the storage management computing device 14. The dashboard processor module 224 provides the display of the authentication information which is then checked against the authentication module 221. After a user of one of the plurality of client computing devices 12(1)-12(n) is authenticated, the dashboard processor module 224 may provide reports and receive control commands from the user of one of the plurality of client computing devices 12(1)-12(n). Additionally, the dashboard processor 224 may be in communication with one or more of the object model module 223 and storage manager module 222 in order to facilitate the user in discovering network resources to administer and to control/manipulate the storage network within the plurality of server storage devices 16(1)-16(n). As previously illustrated, it is to be noted that depending on the type of the user using one the plurality of client computing device 12(1)-12(n), the dashboard processor module 224 will provide differing data. By way of example, one example may allow for a single dashboard or tool to manage a storage environment at multiple levels of access (e.g. administrator using the storage administration computing device 13 and user using one of the plurality of client computing devices 12(1)-12(n)). In another example, the dashboard processor module 224 may interface with a program executing on the plurality of client computing devices 12(1)-12(n). In this example, the plurality of client computing devices 12(1)-12(n) may execute a distinct application, or an application which executes a plugin, that provides a user interface area to a user which configured to allow for the sending/receiving of data between the plurality of client computing devices 12(1)-12(n) and dashboard processor module 224.

The communication interface 24 of the storage management computing device 14 operatively couples and communicates between the plurality of client computing devices 12(1)-12(n), the storage administration computing device 13, storage management computing device 14 and the plurality of server storage devices 16(1)-16(n), which are all coupled together by the communication network 30, although other types and numbers of communication networks or systems with other types and numbers of connections and configurations to other devices and elements. By way of example only, the communication networks 30 can use TCP/IP over Ethernet and industry-standard protocols, including NFS, CIFS, SOAP, XML, LDAP, and SNMP, although other types and numbers of communication networks, can be used. The communication networks 30 in this example may employ any suitable interface mechanisms and network communication technologies, including, for example, any local area network, any wide area network (e.g., Internet), teletraffic in any suitable form (e.g., voice, modem, and the like), Public Switched Telephone Network (PSTNs), Ethernet-based Packet Data Networks (PDNs), and any combinations thereof and the like.

In this example, the bus 26 is a universal serial bus, although other bus types and links may be used, such as PCI-Express or hyper-transport bus.

Additionally, each of the plurality of client computing devices 12(1)-12(n) includes a processor, a memory, and a communication interface, which are coupled together by a bus or other link, although other numbers and types of devices and/or nodes as well as other network elements could be used. In this example, the plurality of client computing devices 12(1)-12(n) assists the user of the client computing device 12(1)-12(n) with submitting access requests to the plurality of server storage devices 16(1)-16(n) by issuing packets using object-based access protocols, such as the Common Internet File System (CIFS) protocol, Network File System (NFS) protocol, Small Computer Systems Interface (SCSI) protocol encapsulated over TCP (iSCSI), and SCSI encapsulated over Fibre Channel (FCP) for instance. In another example use, plurality of client computing devices 12(1)-12(n) may log into the storage management computing device 14. Upon being authenticated by the storage management computing device 14, the plurality of client computing devices 12(1)-12(n) may implement a discovery step which searches the object model within the storage management computing device 14 for objects of with the plurality of server storage devices 16(1)-16(n) that pertain to the user (e.g. logical units, SVMs, and the like). Identification of these objects that pertain to the plurality of the client computing devices 12(1)-12(n) may be implemented using multiple methods (e.g. searching host names, IP addresses and the like). By way of example only, the object model may allow for logical entities to be discovered without needing to know the physical association with the logical entity. Therefore, monitoring and controlling of storage resources by the plurality of client computing devices 12(1)-12(n) may be implemented without also monitoring the physical entities. With the proper objects identified, information may be provided by the storage management computing device 14 to plurality of client computing devices 12(1)-12(n) pertaining to monitored usage, e.g. failures of logical objects, statistics regarding usage associated with the user of the plurality of client computing devices 12(1)-12(n), available space, etc. Control commands may also be sent from the plurality of client computing devices 12(1)-12(n) to the storage management computing device 14 in order to alter one or more aspects of the storage environment.

The storage administration computing device 13 includes a processor, a memory, and a communication interface, which are coupled together by a bus or other link, although other numbers and types of devices and/or nodes as well as other network elements could be used. An administrator using the storage administration computing device 13 may log into the storage management computing device 14. Upon being authenticated by the storage management computing device 14, the administrator may implement a discovery step which searches the object model within the storage management computing device 14 for volumes/objects that is associated to the administrator. Identification of volumes and objects that pertain to the administrator may be implemented using multiple methods (e.g. searching host names, IP addresses and the like). With the proper objects identified, information may be provided to the storage administration computing device pertaining to monitored usage, e.g. failures of physical resources, statistics regarding total system usage, user storage actions/usage, etc. Control commands may also be sent from the storage administration computing device 13 to storage management computing device 14 in order to alter one or more aspects of the storage environment.

Next, each of the plurality of server storage devices 16(1)-16(n) includes a processor, a memory, and a communication interface, which are coupled together by a bus or other link, although other numbers and types of devices and/or nodes as well as other network elements could be used. The plurality of server storage devices 16(1)-16(n) may store and provide content or other network resources in response to requests from the storage management computing device 14 via the communication networks 30, for example, although other types and numbers of storage media in other configurations could be used. Additionally, each of the plurality of server storage devices 16(1)-16(n) provides a physical data storage system adapted to provide storage services for a plurality of client computing devices 12(1)-12(n). In this example, resources (e.g., data blocks) of physical data storage devices of the plurality of server storage devices 16(1)-16(n) are logically mapped to provide logical storage objects referred to as virtual storage instances (VSIs) (e.g., SVMs) for use by the plurality of client computing devices 12(1)-12(n) or the storage administration computing device 13. In this example, each of the plurality of server storage devices 16(1)-16(n) includes one or more nodes configured to communicate with storage devices within each of the plurality of server storage devices 16(1)-16(n). As it would be appreciated by a person having ordinary skill in the art, node is an operating unit, such as a processor-based system (e.g., computer, network appliance, etc.) and associated instruction set (e.g., software, firmware, application, etc.), operable to provide a desired function, service, or operation, or portion thereof, and which may cooperate with other nodes to provide a desired function, service, or operation.

Although the exemplary network environment 10 with the plurality of client computing devices 12(1)-12(n), the storage administration computing device 13, storage management computing device 14, plurality of server storage devices 16(1)-16(n), and communication networks 30 are described and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the present technology as described and illustrated by way of the examples herein, as described herein, which when executed by the processor, cause the processor to carry out the steps necessary to implement the methods of this technology as described and illustrated with the examples herein.

This technology provides methods, non-transitory computer readable medium and devices which monitors and controls a storage environment for access by the plurality of client computing devices 12(1)-12(n) and storage administration computing device 13. Additionally, the technology utilizes isolation and abstraction techniques in the storage object model and/or in one or more of the discovery, monitoring, alerting and reporting workflows within the storage environment. Such isolation and abstraction techniques may function to isolate storage entities in a network, e.g. isolate portions that may correspond to each of the plurality of client computing devices 12(1)-12(n) (such as logical/virtual entities) from underlying physical entities. The storage management computing device 14 using object model, provides the plurality of client computing devices 12(1)-12(n) and the storage administration computing device 13 accesses to the plurality of server storage devices 16(1)-16(n).

By way of example only, the storage management computing device 14 using storage object model may allow storage virtual machines (SVMs) within each of the plurality of server storage devices 16(1)-16(n) to be discovered, monitored and/or managed independently of the physical storage entities. In this example, the object model may include database associations between SVMs and physical storage entities which are not restrictive so as to cause interdependent management. For example, a logical element, such as an SVM, may not require a database key in a relational table to correspond to the location of the physical element which underlies the logical element. Accordingly, the object model provides access information within the server storage devices 16(1)-16(n) at different levels. For example, the plurality of client computing devices 12(1)-12(n) may access information regarding a SVM assigned to the each of the plurality of client computing devices 12(1)-12(n) and subsequently control aspects of the SVM independent of managing/controlling an underlying physical entity. In contrast, the storage management computing device 14 using the object model may allow for an administrator-level user to manage/control physical storage entities and/or SVMs within the plurality of server storage devices 16(1)-16(n).

While using such an object model during a discovery workflow, technology disclosed may allow users of the plurality of client computing devices 12(1)-12(n) to add individual storage virtual machines (SVMs) through their individual identity namespaces (e.g. fully-qualified domain name, IP address, with credentials, etc.) or to add an entire storage entities (clusters consisting of multiple physical storage entities and SVMs) which automatically adds all the individual storage virtual machines (SVMs). Accordingly, the users of the plurality of client computing devices 12(1)-12(n) can add individual storage virtual machines (SVMs) allows administrator using the storage administration computing device 13 to add physical resources such as a node, storage device or an entire cluster with administrator credentials.

Alternatively in another example, when a user of one of the plurality of client computing devices 12(1)-12(n) tries to add a storage virtual machine (SVM) whose parent cluster is already added, a notification may be provided to the requesting one of the plurality of client computing devices 12(1)-12 (n) reporting the storage virtual machine (SVM) is already monitored by virtue of its parent cluster being monitored and may provide instructions to the requesting one of the plurality of client computing devices 12(1)-12(n) to monitor the parent or child. In yet another example, if the user of one of the plurality of client computing devices 12(1)-12(n) tries to add a cluster whose child storage virtual machine (SVM) is already added, a notification may be provided to the user of one of the plurality of client computing devices 12(1)-12(n) reporting such and also advising what steps to take to monitor the cluster or storage virtual machine (SVM). After a storage entity is added, additional storage objects may be discovered. Additionally, technology disclosed may utilize multi-threading to discover storage objects in a parallel fashion and then insert them into the database. Such discovery may be implemented in such a way that it parallelizes the discovery workload independent of whether storage virtual machines (SVMs) were added, or entire clusters were added, or both. Further, database associations between storage virtual machines (SVMs) and their parent clusters (if added) may be discovered using the credentials provided by users of the plurality of client computing devices 12(1)-12(n). By way of example only, one or more storage objects within the plurality of server storage devices 16(1)-16(n) may have monitors associated therewith that monitor health states corresponding to their related storage objects. For example, users of the plurality of client computing devices 12(1)-12(n), may monitor health states across corresponding logical objects. Likewise, administrator using the storage administration computing device 13 may monitor health states across logical and physical storage objects with the plurality of server storage devices 16(1)-16(n).

In on example, reports, dashboards and/or views may be designed to display relevant information at the cluster level and/or at the individual storage virtual machine (SVM) level. This allows users of the plurality of client computing devices 12(1)-12(n) to have detailed insight into user resources corresponding to the individual users, while also allowing an administrator of the storage administration computing device 13 to have detailed insight across his whole storage environment (physical and logical). Such dashboards or views may be provided by the storage management computing device 14 in response to authentication of users of the plurality of client computing devices 12(1)-12(n). It is further noted that while the above object modeling is discussed in terms of separating virtual entities and physical entities to allow a user administration of virtual entities, networks may assign physical entities to a particular user, in which case the object model may also allow the plurality of client computing devices 12(1)-12(n) control of such assigned physical resources. Accordingly, one embodiment may utilize isolation and abstraction methods to form an object model for a storage environment that functions to isolate storage entities in a network and to provide a user with access to assigned physical and logical resources.

An exemplary method for monitoring and controlling a storage environment will now be described with reference to FIGS. 1-4.

Figure 3:
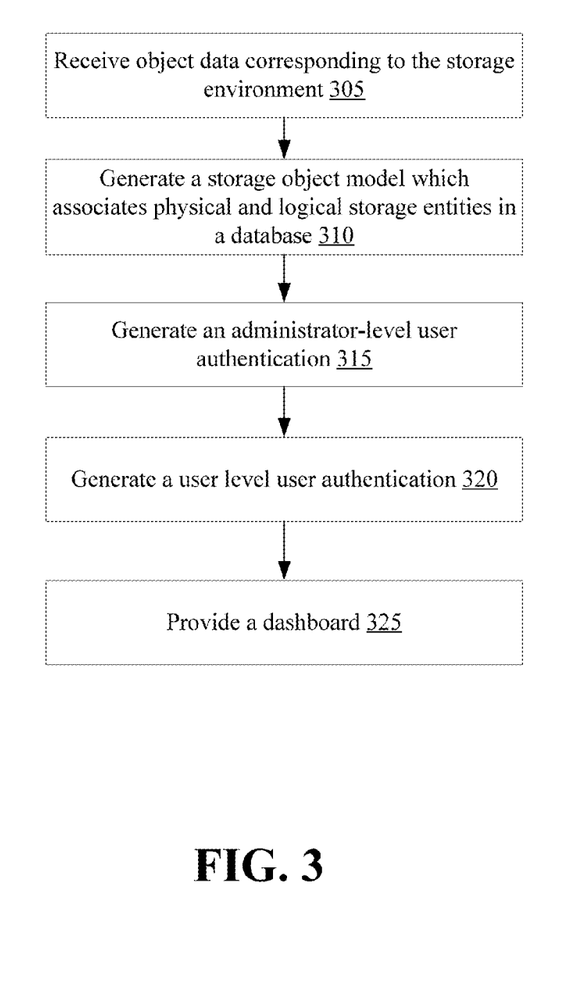
FIGS. 3-4 are flow charts of an example of a method for monitoring and controlling a storage environment.

FIG. 3 illustrates an exemplary method for providing multi-level control of a storage environment. In step 305, the storage management computing device 14 receives an object data corresponding to the storage environment with the plurality of server storage devices 16(1)-16(n). By way of example only, the object data may include data including data corresponding to physical and logical storage entities within the storage environment of the plurality of server storage devices 16(1)-16(n).

Next in step 310, the storage management computing device 14 generates a storage object model which associates physical and logical storage entities in a database.

In step 315, the storage management computing device 14 generates an administrator-level user authentication. By way of example only, such an authentication may be configured to provide the storage administration computing device 13 with access to information in the generated object model which corresponds to both physical and logical storage entities.

In step 320, the storage management computing device 14 generates a user authentication for the plurality of client computing devices 12(1)-12(n). By way of example only, this authentication may be configured to provide the users of the plurality of client computing devices 12(1)-12(n) with access to information in the generated object model that corresponding to logical storage entities assigned to the user.

By way of example only, the administrator-level user authentication and user authentication may be administrative control of the storage environment and/or respective storage entities. Such control may include allowing an administrator or user to add storage entities to the plurality of server storage devices 16(1)-16(n) (e.g. adding physical entities for an administrator and adding logical entities for a user). Further, administrative control may also allow an administrator and user to monitor the state of health of their respective portions of the storage environment.

In step 325, the storage management computing device 14 provides a dashboard 224 configured to receive authentication information from either storage administration computing device 13 or the plurality of client computing devices 12(1)-12(n) and to display information in accordance with a received authentication. Accordingly, a single management product may allow for management of a storage network at multiple levels while utilizing the same interface.

Figure 4:
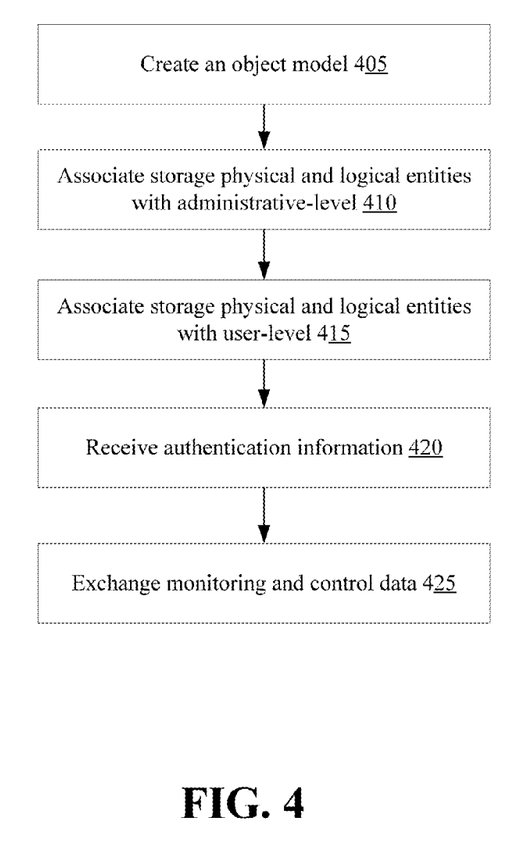

FIG. 4 illustrates an exemplary method for providing multi-level control of a storage environment. In step 405, an object model is created by the storage management computing device 14 containing data which associates physical and logical storage entities.

In step 410, the storage management computing device 14 associates one or more storage physical and logical entities with an administrator using the storage administration computing device 13 based on the created object model.

In step 415, the storage management computing device 14 associates one or more logical entities associated with a user using one of the plurality of client computing devices 12(1)-12(n) based on the created object model. Accordingly, entities may be associated with different levels of users based on the same object model.

In step 420, the storage management computing device 14 receives authentication information corresponding to a user of one of the plurality of client computing devices 12(1)-12 (n).

In step 425, the storage management computing device 14 exchanges monitoring and control data between the user of one of the plurality of client computing devices 12(1)-12(n) based on the authentication level of the user.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:
    receiving, by a storage management computing device, data identifying server storage devices and logical storage entities, wherein the server storage devices and logical storage entities are associated with a storage environment;
    generating, by the storage management computing device, a storage object model based, at least in part, on the data identifying the server storage devices and the logical storage entities, wherein the storage object model associates server storage devices with logical storage entities;

associating, by the storage management computing device, a first user type with the server storage devices and the logical storage entities in the storage object model, wherein the first user type is an administrator-level user type;

associating, by the storage management computing device, a second user type with the logical storage entities in the storage object model, wherein the second user type is not an administrator-level user type;

receiving, by the storage management computing device, a first request to access data associated with the storage environment, wherein the first request to access data is associated with a first user;

determining that the first user is identified as the first user type;

in response to determining that the first user is identified as the first user type, allowing the first user to access data associated with the server storage devices and the logical storage entities;

receiving, by the storage management computing device, a second request to access data associated with the storage environment, wherein the second request to access data is associated with a second user;

determining that the second user is identified as the second user type; and in response to determining that the second user is identified as the second user type,
  allowing the second user to access data associated with the logical storage entities; and
  disallowing the second user access to data associated with the server storage devices.

2. The method of claim 1, wherein the first user type is configured to allow performance of administrative operations associated with the server storage devices.

3. The method of claim 2, wherein the second user type is configured to allow performance of administrative operations associated with the logical storage entities but not the server storage devices.

4. The method of claim 1 further comprising associating the first user with the first user type.

5. The method of claim 4, wherein associating the first user type with the server storage devices and the logical storage entities in the storage object model comprises associating the first user with the server storage devices and the logical storage entities in the storage object model.

6. The method of claim 1, wherein allowing the first user to access data associated with the server storage devices and the logical storage entities comprises determining that the first user type is associated with the server storage devices and the logical storage entities based, at least in part, on the storage object model.

7. The method of claim 6, wherein allowing the second user to access data associated with the logical storage entities comprises determining that the second user type is associated with the logical storage entities based, at least in part, on the storage object model, wherein disallowing the second user access to data associated with the server storage devices comprises determining that the second user type is not associated with the server storage devices based, at least in part, on the storage object model.

8. The method of claim 1 further comprising determining that the second user is assigned to the logical storage entities in the storage object model.

9. A non-transitory computer readable medium having instructions stored thereon, the instructions comprising executable code to:
  detect reception of data identifying server storage devices and logical storage entities, wherein the server storage devices and logical storage entities are associated with a storage environment;
  generate a storage object model based, at least in part, on the data identifying the server storage devices and the logical storage entities, wherein the storage object model associates server storage devices with logical storage entities;
  associate a first user type with the server storage devices and the logical storage entities in the storage object model, wherein the first user type is an administrator-level user type;
  associate a second user type with the logical storage entities in the storage object model, wherein the second user type is not an administrator-lever user type;
  detect a first request to access data associated with the storage environment, wherein the first request to access data is associated with a first user;
  determine that the first user is identified as the first user type;
  in response to a determination that the first user is identified as the first user type, allow the first user to access data associated with the server storage devices and the logical storage entities;
  receive a second request to access data associated with the storage environment, wherein the second request to access data is associated with a second user;
  determine that the second user is identified as the second user type; and
  in response to a determination that the second user is identified as the second user type,
    allow the second user to access data associated with the logical storage entities and
    disallow the second user access to data associated with the server storage devices.

10. The computer readable medium of claim 9, wherein the first user type is configured to allow performance of administrative operations associated with the server storage devices.

11. The computer readable medium of claim 10, wherein the second user type is configured to allow performance of administrative operations associated with the logical storage entities but not the server storage devices.

12. The computer readable medium of claim 9, wherein the executable code further comprises executable code to associate the first user with the first user type.

13. The computer readable medium of claim 12, wherein the executable code to associate the first user type with the server storage devices and the logical storage entities in the storage object model comprises executable code to associate the first user with the sever storage devices and the logical storage entities in the storage object model.

14. The computer readable medium of claim 9, wherein the executable code to allow the first user to access data associated with the server storage devices and the logical storage entities comprises executable code to determine the first user type is associated with the server storage devices and the logical storage entities based, at least in part, on the storage object model.

15. The computer readable medium of claim 14, wherein the executable code to allow the second user to access data associated with the logical storage entities comprises executable code to determine that the second user type is associated with the logical storage entities based, at least in part, on the storage object model, wherein the executable code to disallow the second user access to data associated with the server storage devices comprises executable code to determine that the second user type is not associated with the server storage devices based, at least in part, on the storage object model.

16. The computer readable medium of claim 9, wherein the executable code further comprises executable code to determine that the second user is assigned to the logical storage entities in the storage object model.

17. A storage management computing device comprising:
a processor;
a computer readable storage medium having program code stored therein that is executable by the processor to cause the device to:
detect reception of data identifying server storage devices and logical storage entities, wherein the server storage devices and logical storage entities are associated with a storage environment;
generate a storage object model based, at least in part, on the data identifying the server storage devices and the logical storage entities, wherein the storage object model associates server storage devices with logical storage entities;
associate a first user type with the server storage devices and the logical storage entities in the storage object model, wherein the first user type is an administrator-level user type;
associate a second user type with the logical storage entities in the storage object model, wherein the second user type is not an administrator-level user type;
detect a first request to access data associated with the storage environment, wherein the first request to access data is associated with a first user;
determine that the first user is identified as the first user type;
in response to a determination that the first user is identified as the first user type, allow the first user to access data associated with the server storage devices and the logical storage entities;
receive a second request to access data associated with the storage environment, wherein the second request to access data is associated with a second user;
determine that the second user is identified as the second user type; and
in response to a determination that the second user is identified as the second user type,
allow the second user to access data associated with the logical storage entities; and
disallow the second user access to data associated with the server storage devices.

18. The device of claim 17, wherein the first user type is configured to allow performance of administrative operations associated with the server storage devices.

19. The device of claim 18, wherein the second user type is configured to allow performance of administrative operations associated with the logical storage entities but not the server storage devices.

20. The device of claim 19, wherein the program code executable by the processor to cause the device to associated the first user type with the server storage devices and the logical storage entities in the storage object model comprises program code executable by the processor to cause the device to associate the first user with the server storage devices and the logical storage entities in the storage object model.

21. The device of claim 17, wherein the program code further comprises program code executable by the processor to cause the device to associate the first user with the first user type.

22. The device of claim 17, wherein the program code executable by the processor to cause the device to allow the first user to access data associated with the server storage devices and the logical storage entities comprises program code executable by the processor to cause the device to determine that the first user type is associated with the server storage devices and the logical storage entities based, at least in part, on the storage object model.

23. The device of claim 22, wherein the program code executable by the processor to cause the device to allow the second user to access data associated with the logical storage entities comprises program code executable by the processor to cause the device to determine that the second user type is associated with the logical storage entities based, at least in part, on the storage object model, wherein the program code executable by the processor to cause the device to disallow the second user access to data associated with the server storage devices comprises program code executable by the device to determine that the second user type is not associated with the server storage devices based, at least in part, on the storage object model.

24. The device of claim 17, wherein the program code further comprises program code executable by the processor to cause the device to determine that the second user is assigned to the logical storage entities in the storage object model.

* * * * *